United States Patent [19]

Imam et al.

[11] Patent Number: 5,895,726
[45] Date of Patent: Apr. 20, 1999

[54] LIGHTWEIGHT HIGH DAMPING POROUS METAL/PHTHALONITRILE COMPOSITES

[75] Inventors: M. Ashraf Imam, Great Falls, Va.; Satya B. Sastri, Greenbelt, Md.; Teddy M. Keller, Alexandria, Va.

[73] Assignee: The United States of America as represented by the Secretary of the Navy, Washington, D.C.

[21] Appl. No.: 08/846,192

[22] Filed: Apr. 28, 1997

[51] Int. Cl.$^6$ ..................................................... B32B 3/00
[52] U.S. Cl. ........................ 428/615; 428/545; 428/637; 428/654; 428/658; 428/660
[58] Field of Search .................................. 428/545, 615, 428/547, 550, 637, 654, 658, 660

[56] References Cited

U.S. PATENT DOCUMENTS

| | | | |
|---|---|---|---|
| 3,567,176 | 3/1971 | Johnson | 251/174 |
| 3,955,019 | 5/1976 | Keith | 428/34.5 |
| 3,965,448 | 6/1976 | Browning | 333/248 |
| 3,967,150 | 6/1976 | Lien et al. | 313/338 |
| 4,165,400 | 8/1979 | DeMarco | 427/295 |
| 4,569,821 | 2/1986 | Duperray et al. | 419/2 |
| 4,605,595 | 8/1986 | Tsang et al. | 428/413 |
| 4,732,818 | 3/1988 | Pratt et al. | 428/547 |
| 4,759,000 | 7/1988 | Reitz | 367/176 |
| 4,828,932 | 5/1989 | Morimoto et al. | 428/608 |
| 5,045,636 | 9/1991 | Johnasen et al. | 174/35 MS |
| 5,064,045 | 11/1991 | Leon . | |
| 5,221,324 | 6/1993 | Jin et al. | 75/415 |
| 5,222,561 | 6/1993 | Fisher et al. | 168/12 |
| 5,347,643 | 9/1994 | Miyamoto et al. | 451/241 |
| 5,422,177 | 6/1995 | Fukuda et al. | 428/336 |
| 5,459,114 | 10/1995 | Kaya et al. | 501/96 |
| 5,489,492 | 2/1996 | Asami et al. | 429/212 |
| 5,508,334 | 4/1996 | Chen | 524/474 |
| 5,683,764 | 11/1997 | Alts | 428/34 |

*Primary Examiner*—Ngoclan Mai
*Attorney, Agent, or Firm*—Thomas E. McDonnell; Barry Edelberg

[57] ABSTRACT

Metal foams are impregnated with a phthalonitrile prepolymer. The metal foam/polymer composite formed upon curing has excellent acoustic damping, structural properties, oxidative stability, and flame resistance. Foams of various metals, such as aluminum, titanium, nickel, copper, iron, zinc, lead, silver, gold, platinum, tantalum, and alloys based on these metals may be used.

21 Claims, 10 Drawing Sheets

LIGHTWEIGHT HIGH DAMPING POROUS METAL/PHTHALONITRILE COMPOSITES

BACKGROUND OF THE INVENTION

1. Field of the Invention

The present invention relates generally to lightweight composites and more specifically to lightweight composites with good acoustic damping properties.

2. Description of the Background Art

In many cases, such as in factories, motor vehicles, ships, and submarines, it is desirable to absorb as much noise as possible. In factories, absorbance of machinery noises can minimize noise pollution caused by industrial sounds. In motor vehicles, absorbance of engine noises and noises from road vibration enhances driver and rider comfort. In submarines and ships, the absorbance of machinery sounds helps prevent detection and identification by unfriendly forces. Additionally, in regions where earthquakes are common, the structural components of buildings, bridges, and similar artifacts must not only be strong, but should be able to dampen vibrations.

Past noise reduction efforts have previously taken one of two approaches. The use of soft coupling components (e.g., bushings, pads) to isolate machinery, and the incorporation of structural acoustic damping materials.

Both of these prior art approaches have had drawbacks. Soft coupling components add weight to a device, may require maintenance, and may not be consistent with the required design and performance features. Currently available acoustic damping materials do not exhibit adequate acoustic behavior over broad ranges of temperature, lack the required strain amplitude and frequency, or do not have the desired strength and environmental resistance.

Significant advances have been made to increase the strength and stiffness of lightweight materials. Examples of these developments include the superior density-normalized strength and stiffness of Al—Li, hard dispersion strengthened aluminum and titanium, aluminides, and whisker or fiber reinforced aluminum and magnesium. Although those materials have excellent structural characteristics, the demand continues for high strength, lightweight structural materials that also vastly improve damping capability.

U.S. Pat. No. 4,759,000, the entirety of which is incorporated herein by reference for all purposes, to Ronald P. Reitz describes acoustically transparent windows made of an aluminum/nickel foam impregnated with an acoustically non-absorbent rubber such as BE silicone rubber RTV-11. Nothing in that patent teaches or suggests that a useful material may be obtained by impregnating a metal foam with an acoustically absorptive polymer.

Additionally, demand exists for a lightweight structural material with high stiffness, isotropic mechanical strength, and outstanding fire resistance and high temperature capabilities.

SUMMARY OF THE INVENTION

Accordingly, it is an object of this invention to produce light structural materials having good structural and acoustic damping properties.

It is another object of the present invention to reduce noise derived from the operation of machinery.

It is a further object of the present invention to provide a material with high structural strength, high acoustic damping, superb high temperature properties, and high flame resistance.

These and other objects are achieved by impregnating a metal foam with a phthalonitrile polymer.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

The metal foam of the present invention may be any porous metal workpiece, particularly a metal foam, regardless of shape or percent density, having an open cell structure that permits impregnation with an uncured polymer. Particularly useful metals include aluminum, titanium, nickel, copper, iron, zinc, lead, silver, gold, platinum, tantalum, and alloys (including steel) based on these metals. Other metals may also be used. Aluminum and titanium and alloys thereof are particularly useful because of their low density.

Metal foams may be produced by a variety of known methods. For example, a molten metal may be placed under high pressure so that it dissolves a non-reactive gas. When the pressure is released and the metal is allowed to cool, the dissolved gas escapes and leaves open-celled pores in the metal body. In other processes, foaming agents are added to molten metal. Another process mixes monomers with metal particles and heats the mixture to induce foaming and solidification of the resin. As used herein, the term "resin" encompasses prepolymers, monomers, and mixtures thereof. A "cured resin" is the cured polymer. With further heating, the metal particles consolidate and the polymer hydrolyzes. U.S. Pat. No. 4,569,821, the entirety of which is incorporated herein by reference for all purposes, improves upon that process by substituting a stabilized hydrogel for the monomers, allowing more complete pyrolysis of the organic components during formation of the metal foam.

In a foam, pore size is defined as the number of pores per linear unit length. Because foams have only thin ligaments between the pores, the void diameter of a pore is approximately the reciprocal of the pore size of the foam. Decreasing the void diameter increases the contact surface area between the metal foam and the polymer. Also, as the percent foam density (Foam Density=Density of a One Unit Volume of Foam/Density of One Unit Volume of Metal$\times$100) of the metallic foam decreases, the final product increasingly exhibits the structural characteristics of the polymer material. Thus, as the percent foam density of the metallic foam decreases, the stiffness of the composite decreases. Even with extremely low percent foam densities, however, the stiffness of the composite is superior to that of either of the individual components. Percent foam density and pore size also determine the number of polymer/metal interfaces that an acoustic vibration must traverse. As explained below, the polymer/metal interfaces contribute mainly to the sound damping capabilities of the composites of the present invention. A typical useful pore size is 5–100 pores/inch. More often, a pore size of about 10–50 pores/inch is used, and most often a pore size of about 10–40 pores/inch is used. Typically, the percent foam density is about 5–40. More often, the percent foam density is about 8–10.

Typically, to improve the predictability of the structural and acoustic properties of the composite products of the present invention, the pores (also referred to in the present specification and claims as "cells") within the metal foam have a locally uniform size and distribution. Throughout the present specification and claims, a foam has a locally uniform size and distribution of pores if most of the pores of the foam are surrounded by evenly distributed pores having approximately the same void diameter as the surrounded pore. Local non-uniformity in the size or distribution of the pores within the metal foam decreases the ability to predict the characteristics of the resulting composite. If desired, the metal foam may be divided into regions of different pore size, or may have a gradation of pore sizes in any direction along the metal foam, while maintaining locally uniform pore size, without harming the predictability of performance.

The metal foam may be impregnated by any available method. Typically, the metal foam is impregnated by contacting it with a phthalonitrile resin component. The phthalonitrile resin component may be a neat resin or a neat blend of resins, or may include any catalysts, curing agents, or additives desired. The phthalonitrile resin component may be a powder (of sufficiently small particle size to penetrate the pores of the metal foam), a melt, a room temperature liquid, or a solution, and may include mixtures of several prepolymers and/or monomers (for example, other resins or other phthalonitrile resins). A vacuum or positive pressure may be applied to assist the penetration of the foam by the phthalonitrile resin component. Solvent, if present, is removed by evaporation. The phthalonitrile resin component is then cured (after any needed consolidation step in the case of a powder impregnant) by any method (typically heating) to provide an infinite network phthalonitrile polymer that fills or partially fills the open-cells of the metal foam.

Generally, the method of curing is not critical to the present invention, so long as the metallic foam is not destroyed (for example, by corrosion or melting) during curing. In some cases, the metal foam matrix may serve as a curing catalyst. Therefore, an additional curing agent may not be needed.

Any phthalonitrile resin may be used in the composite according to the present invention. Some typical and useful phthalonitriles are described in the following U.S. Pat. Nos. 4,408,035; 4,409,382; 4,410,676; 4,619,986; 5,003,039; 5,003,078; 5,004,804; 5,132,396; 5,159,054; 5,202,414; 5,208,318; 5,237,045; 5,247,060; 5,262,514; 5,292,854; 5,304,625; 5,350,828; 5,352,760; and 5,464,929, the entireties of all of which are incorporated herein by reference for all purposes.

The viscosity of the phthalonitrile resin component (i.e., the impregnant) can be adjusted both thermally or by adjusting the amount of any solvent used, if necessary. Preferably, the impregnant viscosity should be selected to allow the metal foam to be completely impregnated with the phthalonitrile resin component under practical processing conditions. A high impregnant viscosity may restrict the ability of the phthalonitrile resin component to completely penetrate the open porous structure of the metal foam. This problem may be overcome by forcing, under positive pressure, the phthalonitrile resin component into the pores of the foam. For any given impregnant used, an appropriate impregnant viscosity may be selected empirically, without undue experimentation, given the guidance provided by this specification and the accompanying examples. Phthalonitrile resin component in powder form can be forced into the pores of the metal foam by any method. For example, the powdered phthalonitrile resin component may be poured on top of the metal foam, and positive or negative pressure may be applied to the powder, forcing it into the pores of the foam. At the same time, the metal foam may be vibrated to aid in impregnation.

The acoustic damping capabilities of the composite of the present invention arise in part from the acoustic properties of the polymerized resin component and in part from dissipation of energy at the polymer/metal interface. Energy is never transferred without loss at interfaces between different materials. Therefore, as the number of interfaces that an acoustic vibration must traverse increases, the percentage of dissipated acoustic energy also increases. A metal foam/polymer composite provides numerous interfaces between the polymer and the metal matrix.

For acoustic damping applications, the composite of the present invention should provide a sufficient number of polymer/metal interfaces to allow good acoustic damping. Thus, particularly when formed as a sheet for acoustic damping applications, the smallest dimension of the metal foam (for a sheet, the thickness) is usually at least about 1.5 times the average void diameter of the metal foam. In many cases, for acoustic damping applications, the smallest dimension of the metal foam will be three or more times greater than the average void diameter of the metal foam.

Also, acoustic damping in these materials might be further improved by the inclusion of polymer/gas and/or gas/metal interfaces, which further increase the number of interfaces that an acoustic vibration must traverse through the composite. These polymer/gas and/or gas/metal interfaces may be formed by many mechanisms, such as the use of a foamed resin component to produce the polymeric component of the composite, the dissolution of the neat resin or blend of resins in a solvent before impregnation, or the inclusion of minute amounts of gas, or materials that form a gas or a vapor during curing, within the resin component used to form the polymeric component. The amount of gas or gas forming materials should be sufficient to significantly enhance the acoustic damping capabilities of the composite, but should not provide sufficient gas to essentially destroy the structural integrity of the composite and/or the polymeric component thereof. The optimum amount of any gas or gas producing agent used in the resin component will vary depending upon the desired use for the composite and may be empirically determined without undue experimentation.

The interaction of the metal foam and the polymer matrix also contributes to the structural strength of the composite. Consequently, the structural strength of the metal foam/polymer composite is greater than the individual structural strengths of the metal foam and the polymer.

Composites according to the present invention may be constructed to exhibit acoustic damping across a frequency band residing within a range of typically about 0.001–80 kHz. The precise frequency band, as well as the bandwidth over which a composite according to the present invention exhibits acoustic damping, is determined by the selected polymer, metal, pore size and percent foam density. The frequency range of damping may be extending by stacking together metal foam/polymer composites having different pore sizes, percent metal foam densities, polymers (phthalonitrile or other polymers), and/or metals. Several sheets may be laminated together with adhesive, or in some cases will bond to each other during curing of one or more of the polymers within the metal foams, to form a laminate. Pore size and percent metal foam density may also be varied, without stacking, by providing a metal foam having regions of different average pore size or having an average pore size that is graded in one or more directions. It may also be possible to vary the polymer used within a single sheet. For example, a foam may be impregnated with a first resin component. The resin component-impregnated foam may then be subjected to pressure on, for example its upper surface, to force any portion of the first resin component out in the upper portion of the metal foam down into the lower portion. The resin component-impregnated foam may then be solidified while under this positive pressure. After partial or complete consolidation or solidification of the first resin component in the lower portion of the metal foam, the upper portion of the metal foam may be impregnated with a second resin component.

The composites of the present invention are not only lightweight, but also have excellent impact resistance relative to the metals themselves. Thus, they could present an excellent choice in the design of energy efficient cars. The superior flame resistance and high temperature performance provided by the use of the phthalonitrile polymer also make these composites extremely well suited to use under extreme conditions. For example, the composites of the present invention may be used as high temperature high performance structural materials for extraterrestrial vehicles such as the National Aerospace Plane (NASP), the next generation space shuttle, reusable launch vehicles/boosters, high performance heat engines, gas turbine engines, heat exchangers, and electronic applications. Aside from enhanced performance, components manufactured using composites according to the present invention may alter the noise properties of machinery, aerospace vehicles, domestic vehicles, military vehicles, commercial vehicles, marine vehicles and maritime vehicles. Also, composites according to the present invention are readily manufactured, for example, by resin transfer molding (RTM), resin infusion molding, or resin injection molding.

Having described the invention, the following examples are given to illustrate specific applications of the invention including the best mode now known to perform the invention. These specific examples are not intended to limit the scope of the invention described in this application.

EXAMPLES

Example 1: Preparation of phthalonitrile prepolymer

Phthalonitrile monomer, 4,4'-bis(3,4-dicyanophenoxy) biphenyl, was purchased from Daychem Laboratories. 10 g of the monomer was placed in an aluminum planchet and melted on a hot plate at 250° C. (monomer melts around 235° C.). The monomer melt was degassed for about 2 h to eliminate trace amounts of solvent present. The phthalonitrile prepolymer was synthesized by adding 0.15–0.168 g (1.5–1.68 wt %) of 1,3-bis(3-aminophenoxy)benzene, obtained from National Starch Corporation, to the monomer melt. The melt was stirred for 15 min. and was used for fabrication of phthalonitrile/metal foam composite specimens.

Example 2: Fabrication of phthalonitrile/aluminum foam composite

An aluminum mold, 2"×0.6"×0.2", coated with a teflon mold release agent was used for fabrication of composite specimens. Two aluminum foam strips (1"×0.5"×0.185", density 6–8% of the solid material, pore size—40 pores per inch (ppi)) separated by a teflon film, were placed in the mold and heated to 250° C. Approximately 2–3 g of the prepolymer melt synthesized as described above in Example 1 with 1.68 wt % curing additive was poured over the metal foam and degassed for about 15 min.with periodic venting to ensure a good flow of the resin throughout the metal foam. The mold was then heated in an air circulating oven for 9 h at 280° C. and cooled back to room temperature over a 3 h span. The composite samples made with this prepolymer showed an incomplete penetration of the resin into the metal foam. Therefore, subsequent composite fabrications involved a slower curing prepolymer made with 1.5% curing additive. The prepolymer has an initial lower viscosity.

Example 3: Fabrication of phthalonitrile/aluminum foam composite

An aluminum mold, 2"×0.6"×0.2", coated with a teflon mold release agent was used for fabrication of composite specimens. Two aluminum foam strips (1"×0.5"×0.185", density 6–8% of the solid material, pore size—40 ppi) separated by a teflon film, were placed in the mold and heated to 250° C. Approximately 2–3 g of the prepolymer melt synthesized with 1.5 wt % curing additive was poured over the metal foam and degassed for about 15 min. with periodic venting to ensure a good flow of the resin throughout the metal foam. The mold was then heated in an air circulating oven for 9 h at 280° C. and cooled back to room temperature over a 3 h span. The composite samples made with this prepolymer showed a complete penetration of the resin through the metal foam. The mechanical and damping properties of the phthalonitrile/aluminum composite samples were evaluated after heat treatment at the following conditions: (A) 9 h at 280° C. (B) 1 8h at 280° C. (C) 18 h at 280, 4 h at 325° C. and (D) 18 h at 280, 4 h at 325,4 h at 375° C. Conditions (C) and (D) employed an inert atmosphere purge of argon.

Example 4: Fabrication of phthalonitrile/copper foam composite

An aluminum mold, 2"×0.6"×0.2", coated with a teflon mold release agent was used for fabrication of composite specimens. Two copper foam strips (1"×0.5"×0.185", density 6–8% of the solid material, pore size—10 ppi), separated by a teflon film, were placed in the mold and heated to 250° C. The prepolymer melt synthesized as described above in Example 1 with 1.5 wt % curing additive was poured over the metal foam and degassed with periodic venting to ensure a good flow of the resin throughout the metal foam. The mold was then heated in an air circulating oven for 9 h at 280° C. and cooled back to room temperature over a 3 h span. The mechanical and damping properties of the phthalonitrile/copper composite samples were evaluated after heat treatment at the following conditions: (A) 9 h at 280° C. (B) 18 h at 280° C. (C) 18 h at 280, 4 h at 325° C. and (D) 18 h at 280, 4 h at 325,4 h at 375° C. Conditions (C) and (D) employed an inert atmosphere purge of argon.

Example 5: Fabrication of phthalonitrile/titanium foam composite

An aluminum mold (2"×0.6"×0.2",density 6–8% of the solid material, pore size—10 ppi) coated with a teflon mold release agent was used for fabrication of composite specimens. Two titanium foam strips, 1/41 ×0.5"×0.185", separated by a teflon film, were placed in the mold and heated to 250° C. The prepolymer melt synthesized as described above in Example 1 was poured over the metal foam and degassed for about 15 min.with periodic venting to ensure a good flow of the resin throughout the metal foam. The mold was then heated in an air circulating oven for 9 h at 280° C. and cooled back to room temperature over a 3 h span. The mechanical and damping properties of the phthalonitrile/titanium composite samples were evaluated after heat treatment at the following conditions: (A) 9 h at 280° C. (B) 18 h at 280° C. (C) 18 h at 280, 4 h at 325° C. and (D) 18 h at 280, 4 h at 325,4 h at 375° C. Conditions (C) and (D) employed an inert atmosphere purge of argon.

Example 6: Fabrication of phthalonitrile/zinc foam composite

An aluminum (mold, 2"×0.6"×0.2", density 6–8% of the solid material, pore size—10 ppi) coated with a teflon mold release agent was used for fabrication of composite specimens. Two zinc foam strips, 1"×0.5"×0.185", separated by a teflon film, were placed in the mold and heated to 250° C. The prepolymer melt synthesized as described above in Example 1 with 1.5% curing additive was poured over the metal foam and degassed for about 15 min.with periodic venting to ensure a good flow of the resin throughout the metal foam. The mold was then heated in an air circulating oven for 9 h at 280° C. and cooled back to room temperature over a 3 h span. The mechanical and damping properties of the phthalonitrile/zinc composite samples were evaluated after heat treatment at the following conditions : (A) 9 h at 280° C. (B) 18 h at 280° C. (C) 18 h at 280, 4 h at 325° C. and (D) 18 h at 280, 4 h at 325, 4 h at 375° C. Conditions (C) and (D) employed an inert atmosphere purge of argon.

Example 7. Preparation of Porous Metal/Phthalonitrile Composite Samples for Damping Measurements For the purpose of demonstration, only selected foams and phthalonitrile monomers have been used. Many metals or even high strength alloys can be used as skeleton material to design the composite processing requiring strength and damping capability. Other factors such as environmental capability, temperature and chemical capability in addition to cost can dictate the choice of the materials to be used.

The composites produced in Examples 3–6 were used for damping measurements. The samples were prepared for these measurements with dimensions having 4.5 mm thickness, 10 mm width, and 32 mm length. The damping capacity of the samples were measured with a dynamic mechanical thermal analyzer (DMTA). A small sinusoidal mechanical stress is applied to the sample and the resulting sinusoidal strain transduced. Comparison of the amplitude of the signals yields the complex dynamic modulus E*. The phase lag (d) of strain behind stress is measured and the storage modulus and loss factor of the material are calculated.

Figure 1:
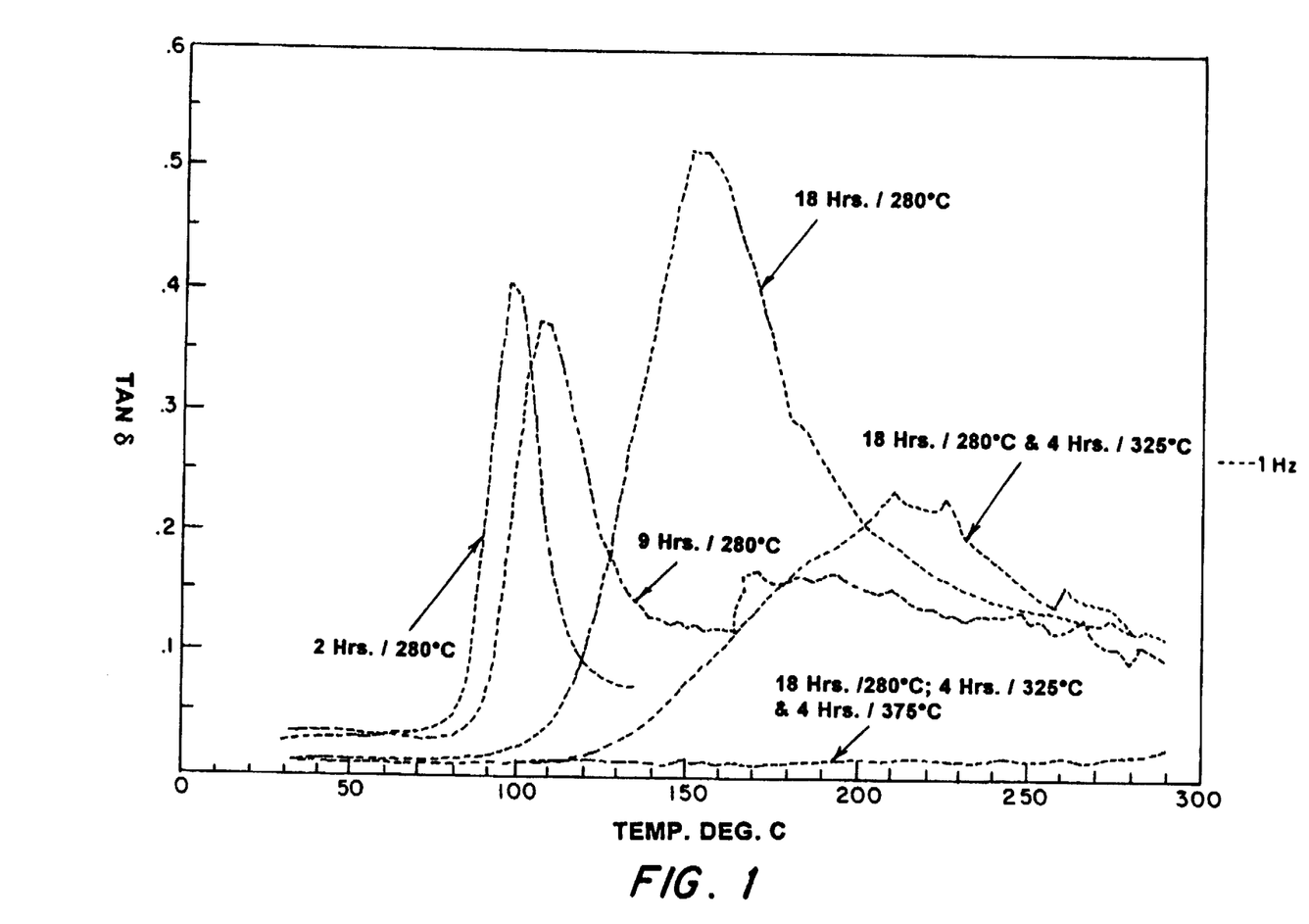
FIG. 1 shows the acoustic damping behavior of an aluminum alloy foam/phthalonitrile composite, heat treated under the various condition described in the accompanying Example 3.
Figure 10:
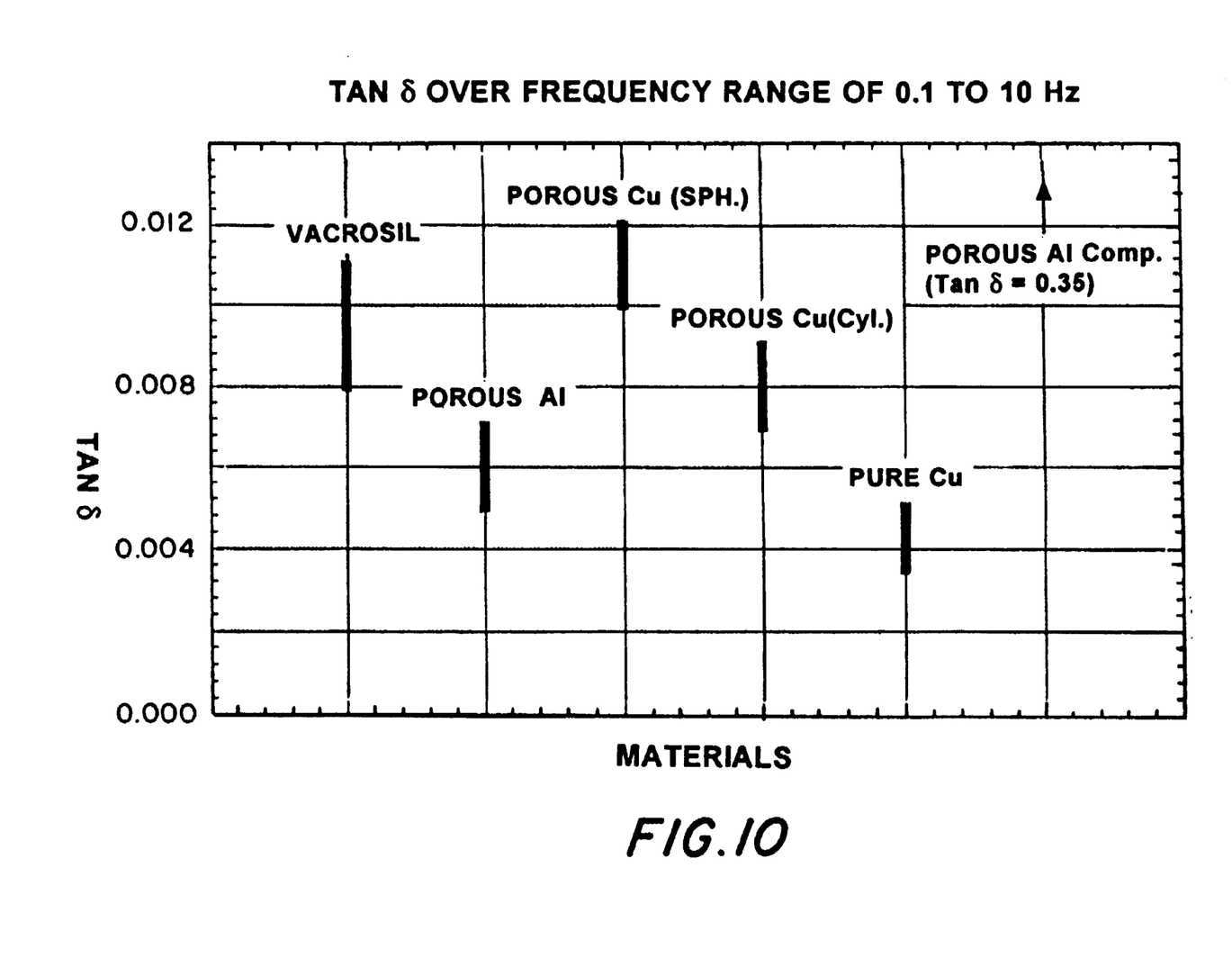
FIG. 10 is a graph showing the Tan$\delta$ over a frequency range of 0.1 to 10 Hz for various polymers and metal foams.

Example 8. Damping Characteristics of Aluminum Alloy Foam/Phthalonitrile Composite The aluminum alloy foam/phthalonitrile composite prepared in Example 3 was evaluated for its damping characteristics under 1 Hz frequency. The results of the damping measurements were shown in FIG. 1. The figure shows the damping behavior of the composite under different heat treatment conditions as described in Example 3. The damping measurements are plotted against temperature. It is noted that damping peak locations at a given temperature can be adjusted based on heat treatment of composite. The room temperature damping (flat portion of curve) is also higher than the best damping material such as Vacrosil™ as shown in FIG. 10.

Example 9. Damping Characteristics of Copper Foam/Phthalonitrile Composite

Figure 2:
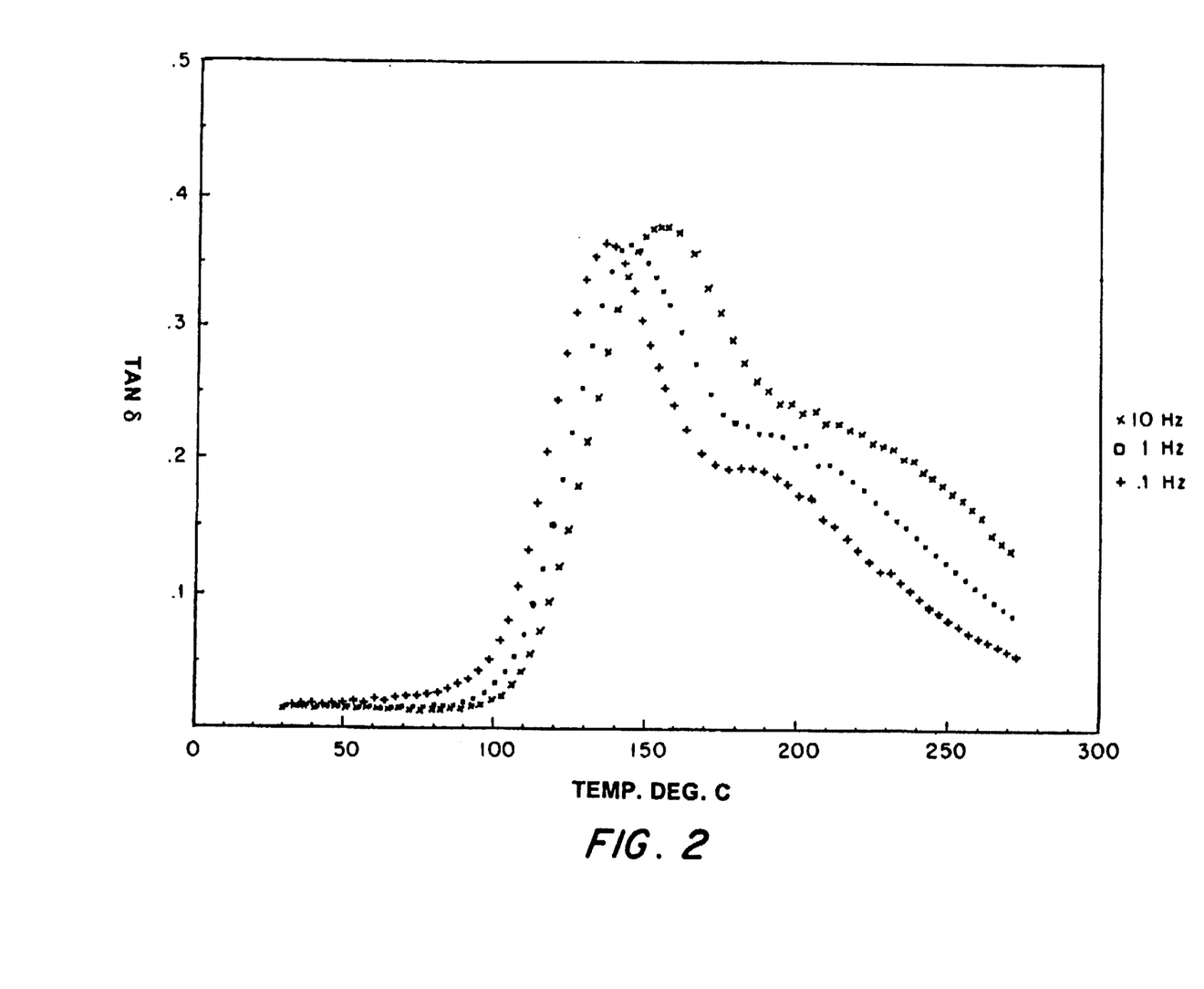
FIG. 2, FIG. 3 and FIG. 4 show the results of damping measurements for a copper foam/phthalonitrile composite, over a frequency range of 0.1 to 10 Hz.
Figure 3:
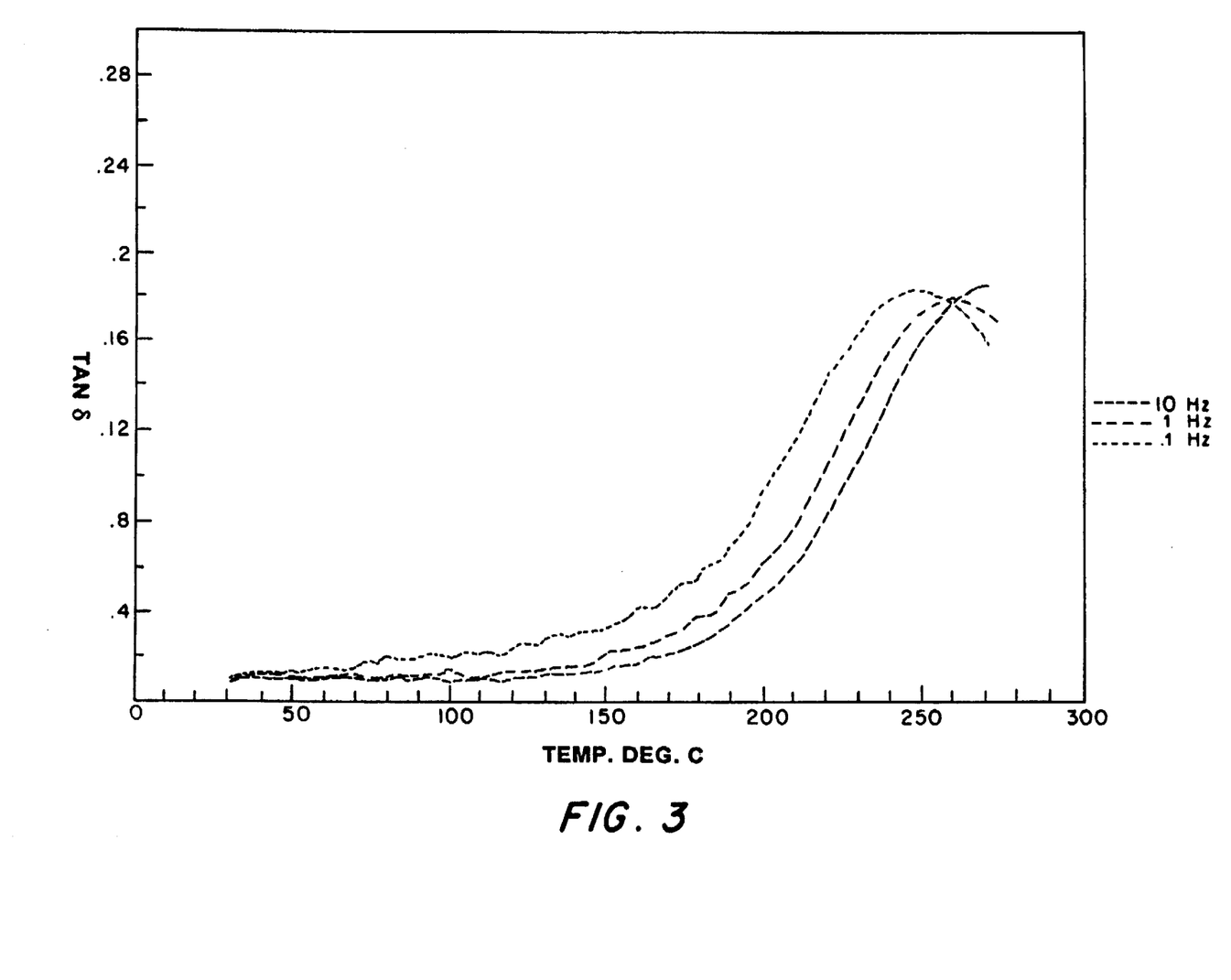
Figure 4:
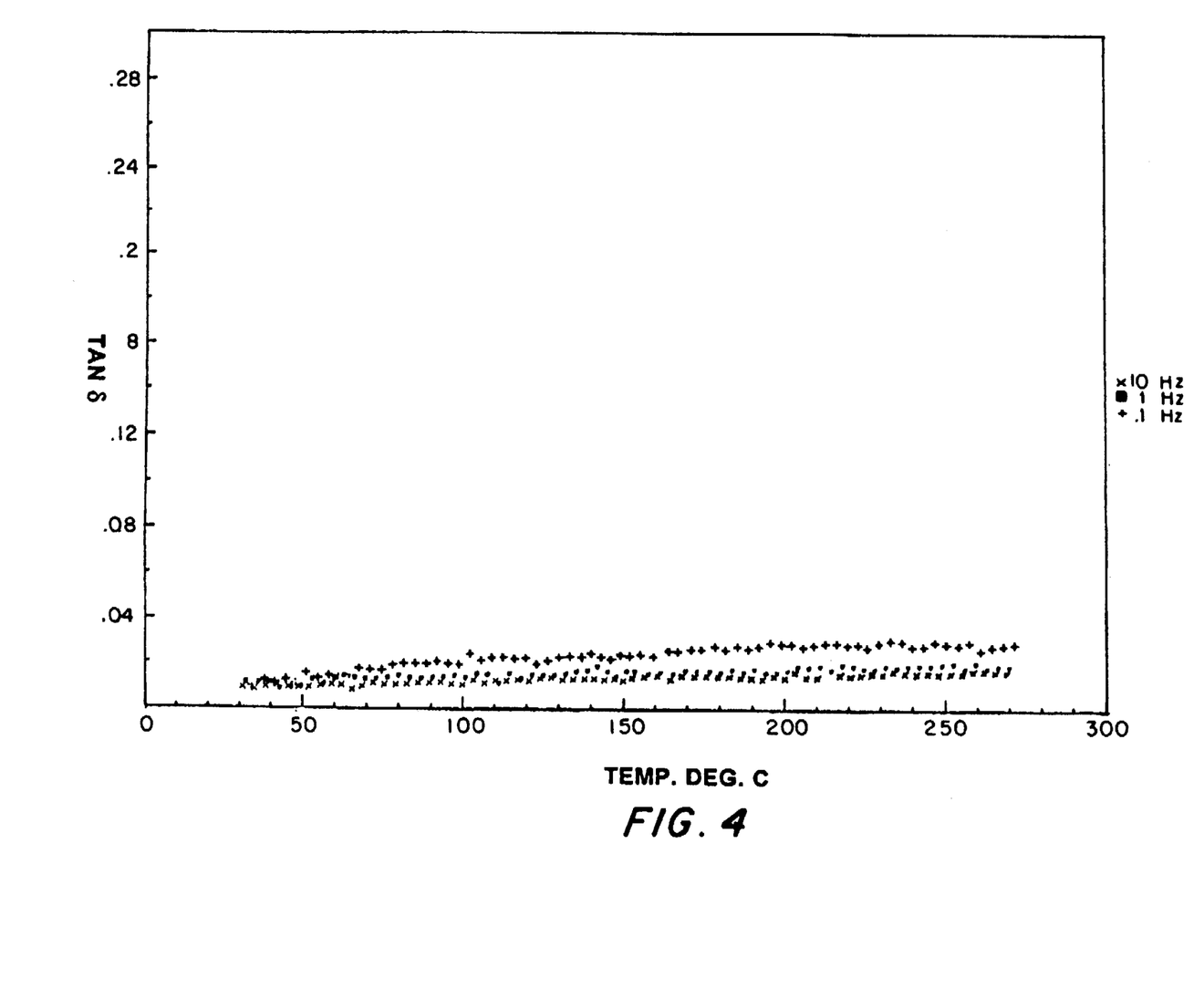

The copper foam/phthalonitrile composite prepared in Example 4 was evaluated for its damping characteristics under 0.1 to 10 Hz frequency. The results of the damping measurements were shown in FIGS. 2 through 4. The figures show the damping behavior of the composite under different heat treatment conditions as described in Example 4. The damping measurements are plotted against temperature. It is noted that damping peak locations at a given temperature can be adjusted based on heat treatment of the composite. The room temperature damping (flat portion of curve) is also higher than the best damping material such as Vacrosil™ as shown in FIG. 10.

Example 10. Damping Characteristics of Titanium Foam/Phthalonitrile Composite

Figure 5:
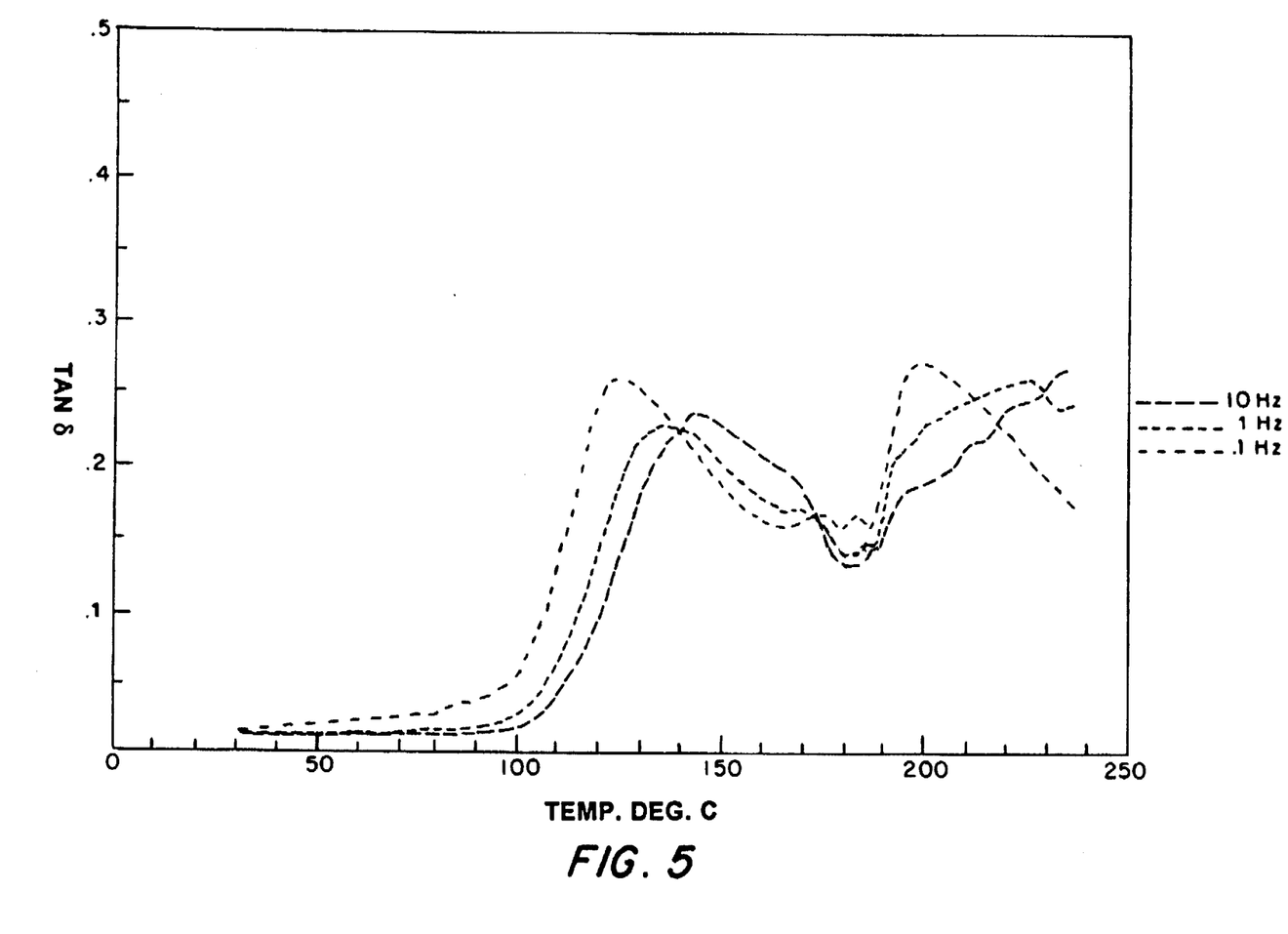
FIG. 5, FIG. 6, and FIG. 7 show the damping behavior of a titanium foam/phthalonitrile composite under different heat treatment conditions as described in Example 5.
Figure 6:
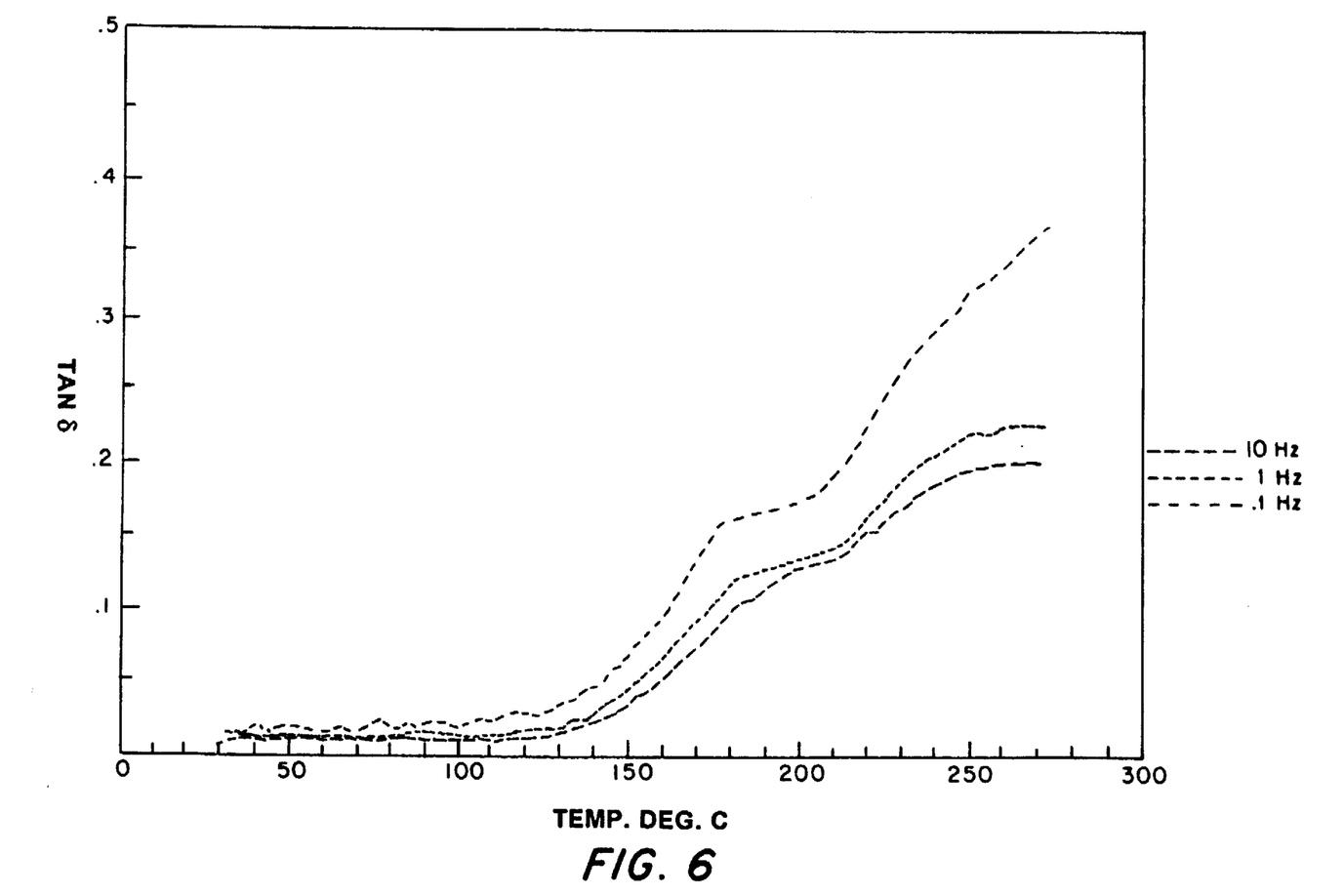
Figure 7:
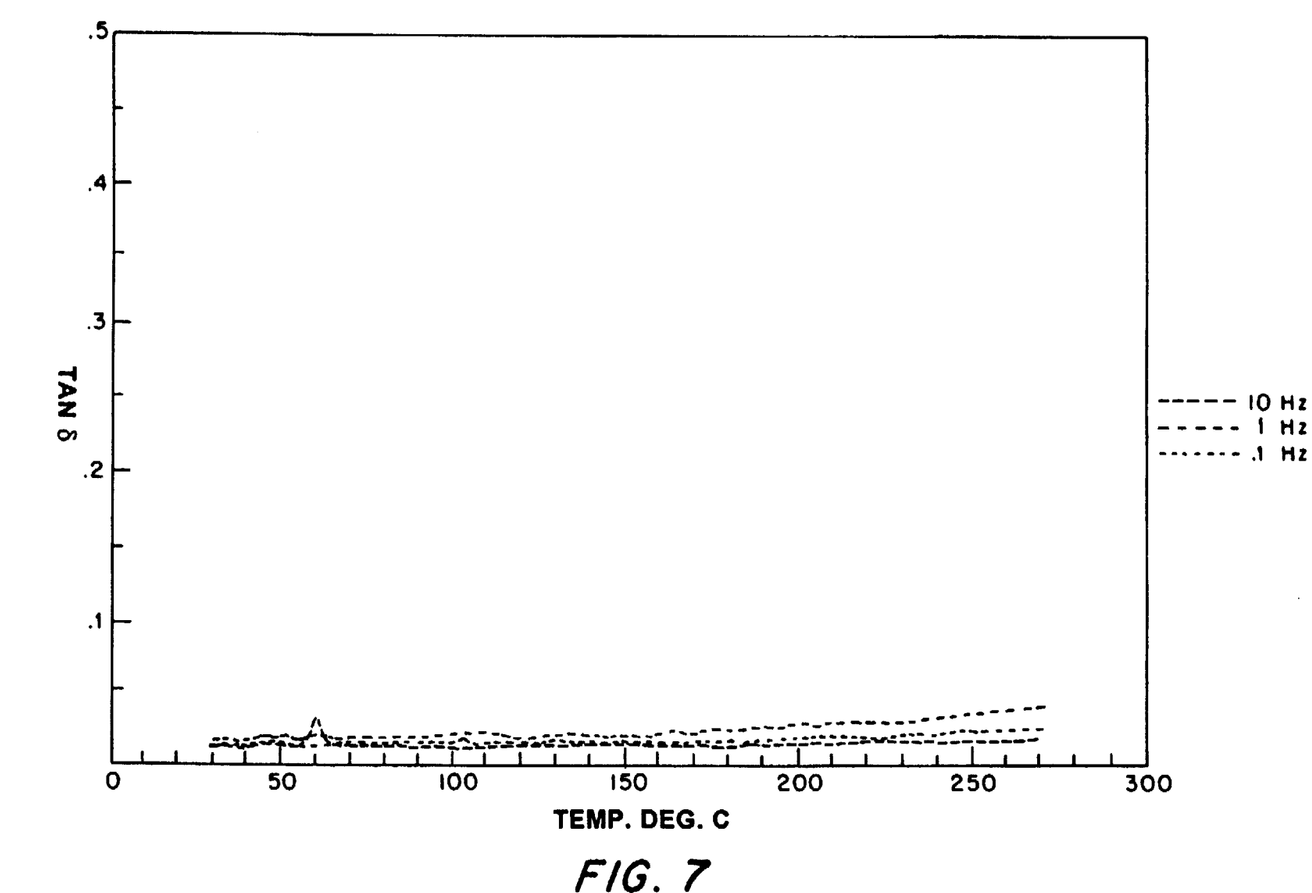

The titanium foam/phthalonitrile composite prepared in Example 5 was evaluated for its damping characteristics under 0.1 to 10 Hz frequency. The results of the damping measurements were shown in FIGS. 5 through 7. The figures show the damping behavior of the composite under different heat treatment conditions as described in Example 5. The damping measurements are plotted against temperature. It is noted that damping peak locations at a given temperature can be adjusted based on heat treatment of the composite. The room temperature damping (flat portion of curve) is also higher than the best damping material such as Vacrosil™ as shown in FIG. 10.

Example 11. Damping Characteristics of Zinc Foam/Phthalonitrile Composite

Figure 8:
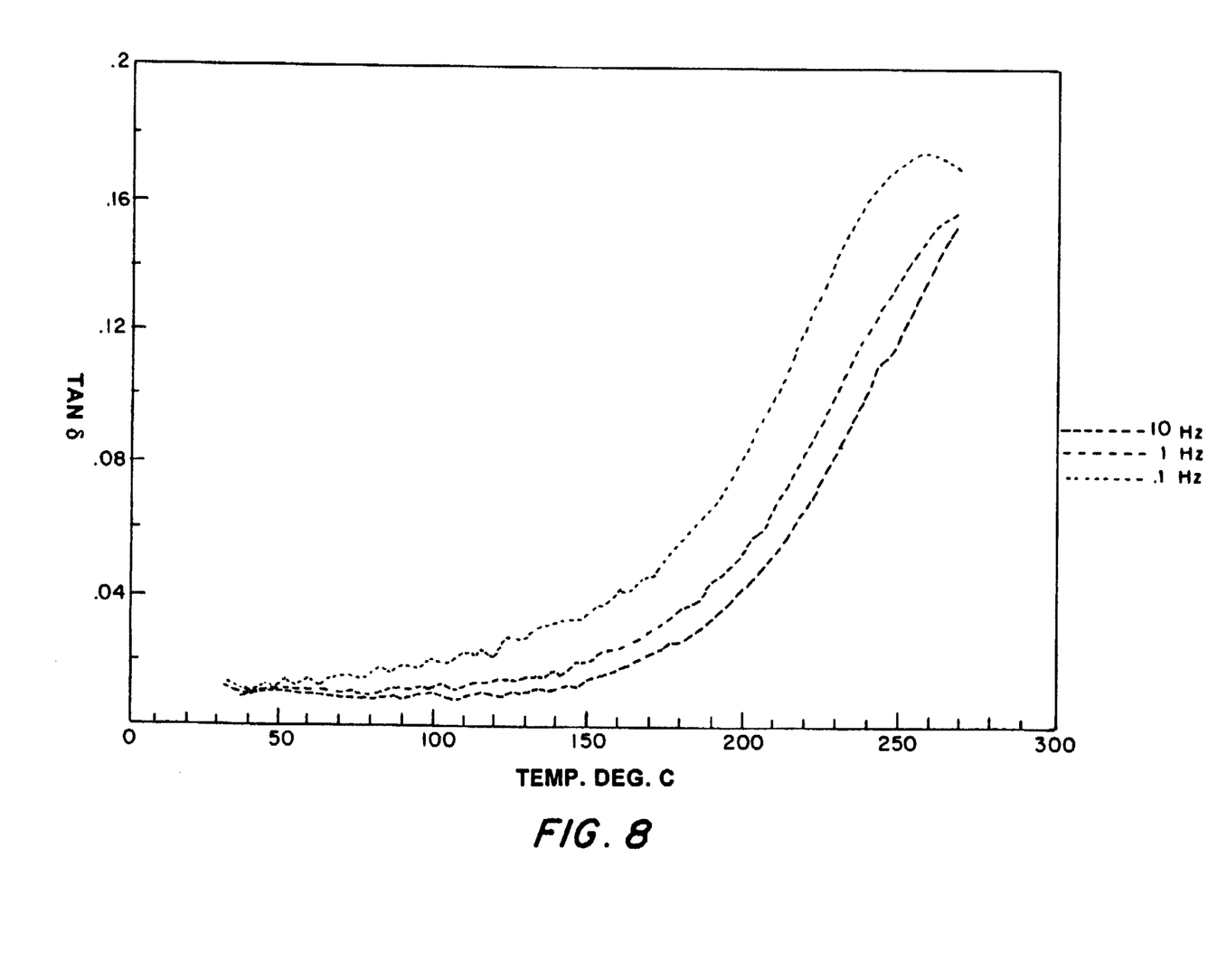
FIG. 8 and FIG. 9 show the damping behavior of a zinc foam/phthalonitrile composite under different heat treatment conditions as described in Example 5.
Figure 9:
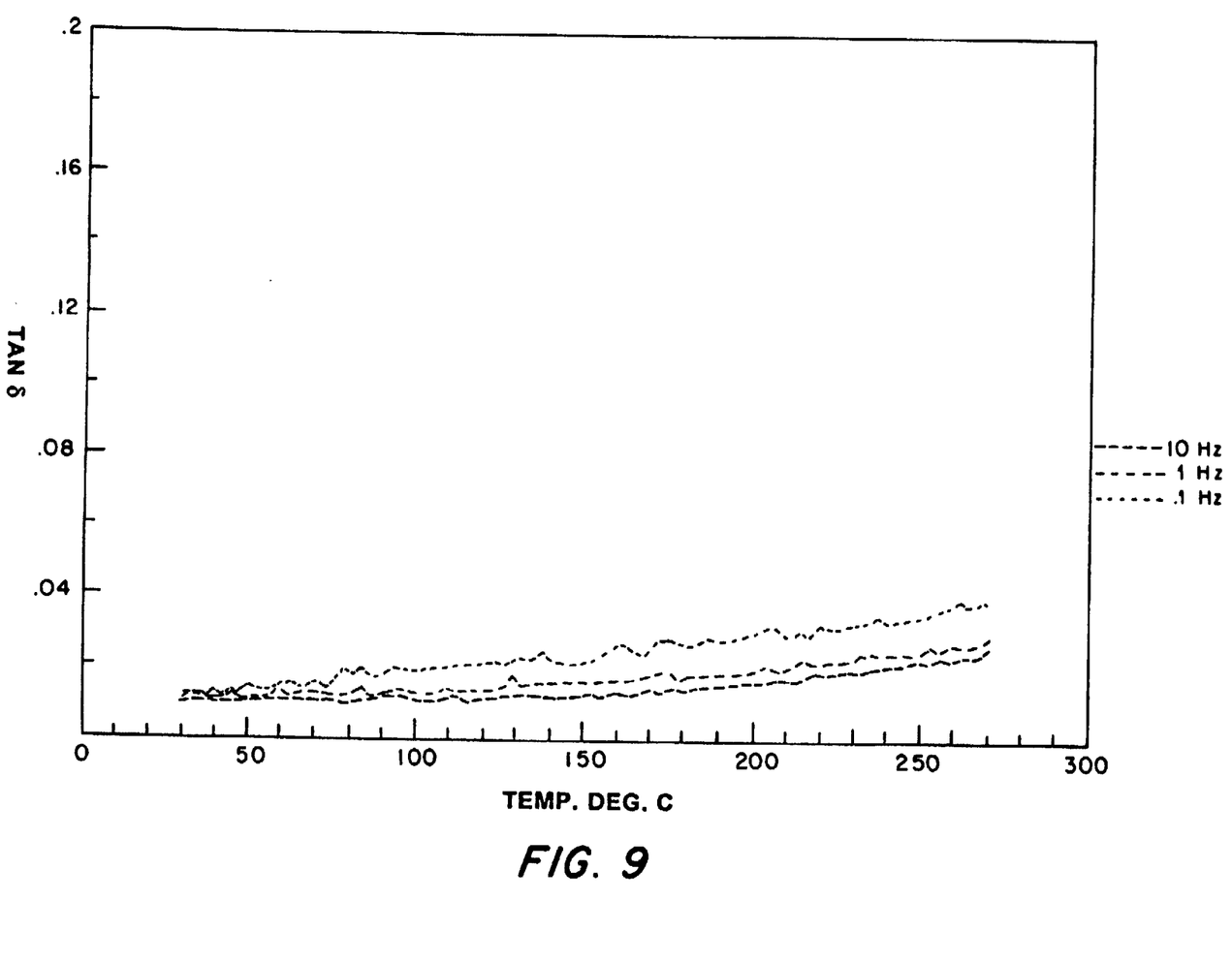

The zinc foam/phthalonitrile composite prepared in Example 6 was evaluated for its damping characteristics under 0.1 to 10 Hz frequency. The results of the damping measurements were shown in FIG. 8 and FIG. 9. The figures show the damping behavior of the composite under different heat treatment conditions as described in Example 5. The damping measurements are plotted against temperature. It is noted that damping peak locations at a given temperature can be adjusted based on heat treatment of the composite. The room temperature damping (flat portion of curve) is also higher than the best damping material such as Vacrosil™ as shown in FIG. 10.

Additional information concerning the present invention may be found in the copending United States Patent Application of Imam, Rath and Keller, entitled POROUS METAL/ORGANIC POLYMERIC COMPOSITES, Ser. No. 845,897 filed on even date herewith, the entirety of which is incorporated herein by reference.

Obviously, many modifications and variations of the present invention are possible in light of the above teachings. It is therefore to be understood that, within the scope of the appended claims, the invention may be practiced otherwise than as specifically described.

What is claimed is:

1. An acoustically damping composite comprising a metal foam, said metal foam having an open cell structure, impregnated with a cured phthalonitrile polymer.

2. The composite of claim 1, wherein said metal is selected from the group consisting of aluminum, aluminum base alloys, titanium, titanium base alloys, nickel, nickel base alloys, copper, copper base alloys, iron, iron base alloys, zinc, zinc base alloys, lead, lead base alloys, silver, silver base alloys, gold, gold base alloys, platinum, platinum base alloys, tantalum, and tantalum base alloys.

3. The composite of claim 1, wherein said metal foam is an aluminum base alloy foam.

4. The composite of claim 1, wherein said metal foam is a titanium foam or a titanium base alloy foam.

5. The composite of claim 1, wherein said metal foam is a copper foam or a copper base alloy foam.

6. The composite of claim 1, wherein said metal foam is a zinc foam or a zinc base alloy foam.

7. The composite of claim 1, wherein said cells have a locally uniform diameter.

8. The composite of claim 7, wherein said metal foam has a gradation of pores sizes in at least one direction along the metal foam.

9. The composite of claim 1, wherein said composite article is in the form of a sheet.

10. A laminate comprising a plurality of sheets according to claim 9 bonded together.

11. A composite according to claim 1, wherein said metal foam has an average pore size of about 5–100 pores/inch and a percent foam density of about 5–40.

12. A composite according to claim 11, wherein said metal foam has an average pore size of about 10–50 pores/inch.

13. A composite according to claim 1, wherein, along its smallest dimension, said metal foam is no smaller than 1.5 times the average void diameter of said pores.

14. A method of forming a composite comprising the steps of:

impregnating a metal foam, said metal foam having an open cell structure, with a phthalonitrile resin component; and converting said phthalonitrile resin component into a solid phthalonitrile bulk polymer within said open cell structure.

15. The method of claim 14, wherein said impregnating step is carried out by placing said cell under a vacuum and contacting said cells, while under vacuum, with said phthalonitrile resin component.

16. The method of claim 14, wherein said impregnating step is carried out by forcing, under positive pressure, said phthalonitrile resin component into said cells.

17. The method of claim 14, wherein said metal is selected from the group consisting of aluminum, aluminum base alloys, titanium, titanium base alloys, nickel, nickel base alloys, copper, copper base alloys, iron, iron base alloys, zinc, zinc base alloys, lead, lead base alloys, silver, silver base alloys, gold, gold base alloys, platinum, platinum base alloys, tantalum, and tantalum base alloys.

18. The method of claim 17, wherein said metal foam is an aluminum base alloy foam.

19. The method of claim 14, wherein said metal foam has a pore size of about 5–100 pores/inch and a percent foam density of about 5–40.

20. The method of claim 14, wherein said composite is a sheet.

21. A method of forming a laminate, comprising the steps of:

producing a plurality of sheets according to claim 20, said sheets being the same or different;

bonding said sheets together to form a laminate.

* * * * *